Sept. 13, 1932.  C. P. KOTTLOWSKI  1,877,339
CHAIN
Filed July 20, 1928
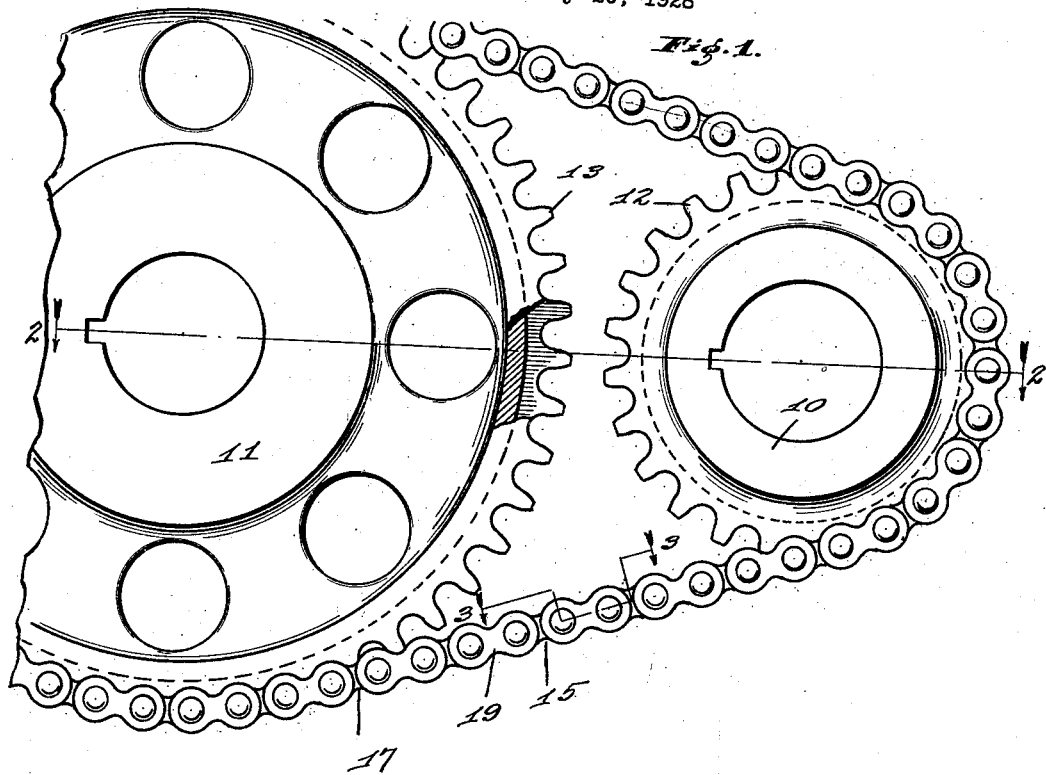
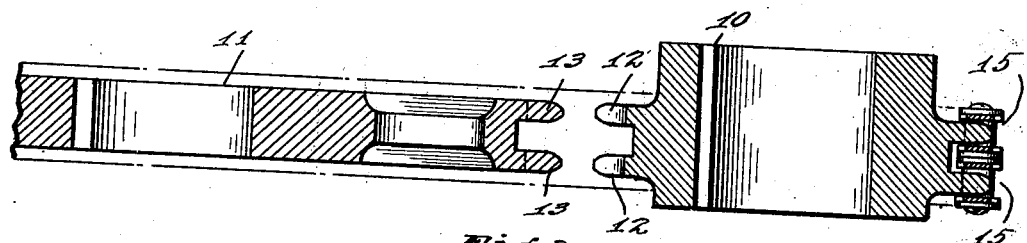
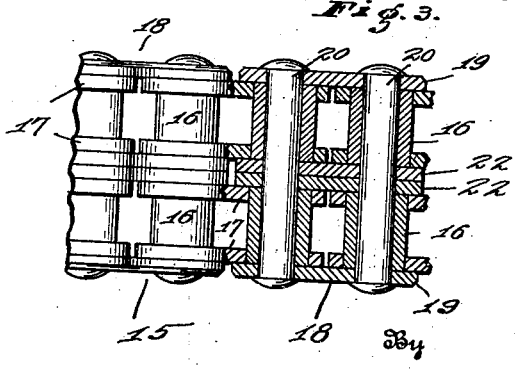
Inventor
CLARENCE P. KOTTLOWSKI,
By
Schley & Trask
Attorneys Patented Sept. 13, 1932

1,877,339

UNITED STATES PATENT OFFICE

CLARENCE P. KOTTLOWSKI, OF INDIANAPOLIS, INDIANA, ASSIGNOR TO DIAMOND CHAIN AND MANUFACTURING COMPANY, OF INDIANAPOLIS, INDIANA, A CORPORATION OF INDIANA

CHAIN

Application filed July 20, 1928. Serial No. 294,203.

My invention is concerned with the production of a chain drive, especially with chain drives of the type used in automobile or other internal combustion engines. In chain drives of this type, it is necessary that the drive be reliable and well able to sustain the forces to which it is subjected in use. Further, it is essential that such drives operate silently or with as little noise as possible at the high speed at which they operate, and this necessitates the employment of a chain having a relatively fine pitch. A fine-pitched chain is necessarily built up of relatively small parts, and the small size of these chain parts militates against that strength which is necessary to the required reliability.

It is the object of my invention to produce a chain drive in which the chain will have the fine pitch necessary to secure silent operation at high speeds and which at the same time will be of adequate strength to secure the necessary reliability.

I accomplish my object by forming the chain of a plurality of parallel series of blocks which are interconnected to form a continuous chain and each series of which co-operates with its own set of sprocket teeth on driving and driven sprockets.

The accompanying drawing illustrates my invention: Fig. 1 is an elevation of a complete chain drive; Fig. 2 is a section on the line 2—2 of Fig. 1; and Fig. 3 is a fragmental section on the line 3—3 of Fig. 1.

As illustrated in the drawing, my chain drive embodies a driving sprocket 10 and a driven sprocket 11, each of which is adapted to be mounted on a suitable shaft (not shown). The sprocket 10 is shown as provided with two peripheral series of teeth 12, and the sprocket 11 is similarly provided with two peripheral series of teeth 13. The sprockets 10 and 11 are so axially disposed that each series of teeth 12 is co-planar with one series of teeth 13.

The chain which I employ to interconnect the sprockets comprises two parallel series of blocks 15. Each of these blocks is conveniently built up of two bushings 16 and two side-bars 17. The side-bars 17 are provided with correspondingly spaced holes within which the bushings 16 have a press fit.

For the purpose of interconnecting the two series of blocks 15, I provide links 18, each of which comprises a pair of outer side-bars 19 and a pair of rivets or pins 20. Each of the rivets 20 passes through one bushing 16 in each of the series of blocks 15, as is clear from Fig. 3, so that the single series of links 18 serves to connect both series of blocks 15 to form a continuous double chain.

The two series of blocks 15 are separated by intermediate side-bars 22 which are arranged in pairs and through each pair of which the rivets 20 of one of the links 18 pass. The pins or rivets 20 have a press fit in the holes in the outer side-bars 19, but preferably, although not necessarily, have a loose or running fit within the holes of the intermediate side-bar 22.

When the chain is mounted on the sprockets, one series of blocks 15 co-operates with one set of teeth 12 and one set of teeth 13, and the other series of blocks co-operates with the other sets of teeth as is clear from Fig. 2. The chain has the fine pitch necessary for silent operation; and, since the driving stress which it conveys is distributed between four side-bars, it is well able to sustain the stresses to which it is subjected in use.

It will be noted that the bushings 16 are not surrounded by rollers and therefore bear directly against the sprocket teeth 12 and 13. This further increases the strength and utility of the chain; for if rollers were employed, the fine pitch of the chain would require that either the rollers or the sprocket teeth be so thin as to be subject to constant breakage.

The chain illustrated and described has but two series of blocks 15, and the sprockets correspondingly have two series of teeth. My invention, however, is not limited to this construction, as the number of series of blocks 15 may be increased to give any desired strength.

I claim as my invention:

1. A chain for co-operating with a sprocket having a plurality of axially spaced rows of teeth, said chain comprising a plurality of series of blocks co-operating respectively with said rows of sprocket teeth, each of said blocks being formed of two side-bars and two spaced bushings mounted therebetween for engagement with the teeth of said sprocket, said bushings having a press fit in holes in said block side-bars, links connecting said blocks, each of said links comprising outer side-bars and pins extending therebetween, each of said pins passing through one bushing of a block in each series of blocks, and one or more intermediate side-bars extending between the two pins of each link and located between adjacent series of blocks.

2. A chain for co-operating with a sprocket having a plurality of axially spaced rows of teeth, said chain comprising a plurality of series of blocks co-operating respectively with said rows of sprocket teeth, each of said blocks being formed of two side-bars and two spaced bushings mounted therebetween for engagement with the teeth of said sprocket, said bushings having a press fit in holes in said block side-bars, and links connecting said blocks, each of said links comprising outer side-bars and pins extending therebetween, each of said pins passing through one bushing of a block in each series of blocks.

3. A chain as set forth in claim 1 with the addition that said pins have a press fit in openings in said outer side-bars and a running fit in openings in said intermediate side-bars.

In witness whereof, I have hereunto set my hand at Indianapolis, Indiana, this 14th day of July, A. D. one thousand nine hundred and twenty eight.

CLARENCE P. KOTTLOWSKI.